(No Model.)
J. H. BARLEY.
Harrow.
No. 231,257. Patented Aug. 17, 1880.
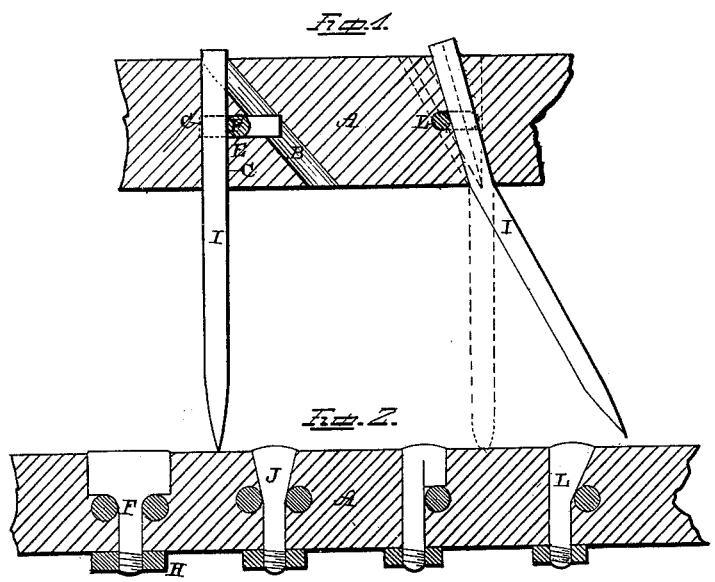
Witnesses:
W. W. Mortimer
Will H. Kern
Inventor:
Jas. H. Barley,
per
F. A. Lehmann,
Atty.

UNITED STATES PATENT OFFICE.

JAMES H. BARLEY, OF SEDALIA, MISSOURI.

HARROW.

SPECIFICATION forming part of Letters Patent No. 231,257, dated August 17, 1880.

Application filed April 9, 1880. (No model.)

*To all whom it may concern:*

Be it known that I, JAMES H. BARLEY, of Sedalia, in the county of Pettis and State of Missouri, have invented certain new and useful Improvements in Harrows; and I do hereby declare the following to be a full, clear, and exact description of the invention, such as will enable others skilled in the art to which it pertains to make and use it, reference being had to the accompanying drawings, which form part of this specification.

My invention relates to an improvement in harrows; and it consists in the combination of a harrow-tooth which is bent at its upper end where it passes through the beam and a clamping-bolt which passes through the side of the beam and bears against the side of the tooth, whereby the tooth can be reversed in position, so as to incline backward or stand vertically.

It further consists in harrow-teeth which are passed down through the center of the beam, in combination with clamping-bolts which pass through the side of the beam at an angle to the teeth and bear against the sides of the teeth with their tapering heads, so as to hold the teeth in position by frictional contact only, as will be more fully described hereinafter.

Figure 1 is a vertical section of the beam, showing the manner of adjusting the teeth at any desired angle. Fig. 2 shows the different forms of tightening-bolts which are passed horizontally through the beam of the harrow for the purpose of holding the teeth rigidly in position.

A represents the beam of a harrow, through which is bored a vertical hole, C, which hole C starts from the same point at the top of the beam as the hole B; but, instead of passing vertically through the beam, this hole B extends at any desired angle either toward the front or the rear end of the harrow. Bored horizontally through the frame A, midway between this vertical hole C and the inclined hole B, is the hole E, through which is passed the headed bolt F, which bolt has a screw-thread upon one end to receive the nut H. When the harrow-tooth I is passed through the vertical hole C or through the inclined hole B, so as to work at an angle, this bolt F bears against its side with its head in such a manner that when the bolt is tightened rigidly in place by means of the nut H the harrow-tooth will be held securely in place.

Instead of the headed bolt F, as here shown, a bolt having two inclined sides on its head, like the one J, may be used; but a bolt having but a single inclined side may be used, in which case it will be necessary to reverse the bolt when the tooth is changed from the hole B to the hole C, or vice versa.

All of these bolts have their heads embedded in the side of the beam, as shown, where they are so rigidly held that the slightest play in any direction is impossible. Thus held they are much less liable to work loose, and hence it is not so hard to fasten them in place.

I also provide for the adjustment of the teeth at any desired angle by first drawing a line vertically through the beam A, and then drawing another line at any desired angle thereto, the lower end of the inclined line running into the vertical one at its lower end. Midway between this vertical line and the inclined one I draw a third line, and parallel with this line I bore a hole through the beam, and through which I pass the harrow-tooth. This harrow-tooth is bent at any desired angle, as shown in Fig. 1, so that by simply turning the tooth around it can be made to work at an oblique angle or vertically, as may be preferred. This tooth will be held in either one of the positions by means of the bolt L, which has preferably a shoulder formed on one side, and which shoulder clamps the side of the tooth, as shown in Fig. 2.

By thus bending the teeth and making them reversible by simply turning them around a very simple and speedy method of changing the teeth is secured.

I do not limit myself to the precise arrangement of parts here shown, but show the two forms of construction which are most preferable for using in connection with a clamping-bolt, by which I secure the teeth in position. These two constructions may be slightly varied without departing from the spirit of my invention, as grooves or notches, or their equivalents, may be formed in the side of either wood or iron bars at the desired angle, and in which, when the bent tooth is secured therein, the tooth will reverse by turning it around from a slanting to a vertical line with the beam, the same as if the hole for the teeth were formed through the body of the bar.

Having thus described my invention, I claim—

1. In a harrow, the combination of the tooth I, having its upper end bent as shown, with the beam A, having an inclined hole through it to receive the bent end of the tooth, and a clamping device for holding the tooth in position, whereby the tooth may be reversed, so as to stand vertically when the harrow is drawn from one end, and to stand at an oblique angle to the beam when drawn from the other end, as described.

2. In a harrow, a clamping-bolt having an enlarged tapering head, and which passes horizontally through the sides of the beam, and a tooth which passes down through the center of the beam, so as to be braced at its upper end, the tooth being held in position by frictional contact against the tapering side of the head, substantially as set forth.

3. In a harrow, the combination of the beam A, having a hole or holes made vertically through its center, a tooth, and a clamping-bolt which has an enlarged tapering head, and which passes through the beam at an angle to the tooth, so that the tapering head will bear against the side of the tooth and hold it in place by frictional contact only, substantially as specified.

In testimony that I claim the foregoing I have hereunto set my hand and seal this 20th day of March, 1880.

JAMES H. BARLEY. [L. S.]

Witnesses:
   A. P. MOREY,
   J. D. CRAWFORD.